US008773369B2

(12) United States Patent
Nagata et al.

(10) Patent No.: US 8,773,369 B2
(45) Date of Patent: Jul. 8, 2014

(54) SENSORING APPARATUS OF PROXIMITY AND CONTACT, AND DISPLAY DEVICES

(75) Inventors: Koji Nagata, Hachioji (JP); Toshiyuki Kumagai, Mobara (JP); Norio Mamba, Kawasaki (JP); Koji Hayakawa, Chosei (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 590 days.

(21) Appl. No.: 12/784,997

(22) Filed: May 21, 2010

(65) Prior Publication Data
US 2010/0295810 A1 Nov. 25, 2010

(30) Foreign Application Priority Data

May 25, 2009 (JP) ................. 2009-125382

(51) Int. Cl.
*G06F 3/041* (2006.01)
*G06F 3/044* (2006.01)
(52) U.S. Cl.
CPC .... *G06F 3/0416* (2013.01); *G06F 2203/04808* (2013.01); *G06F 3/044* (2013.01)
USPC ........................................................ 345/173
(58) Field of Classification Search
USPC ........................................................ 345/173
See application file for complete search history.

(56) References Cited

U.S. PATENT DOCUMENTS

| 7,663,607 | B2 | 2/2010 | Hotelling et al. |
| 7,672,526 | B2 | 3/2010 | Kondo et al. |
| 2008/0087477 | A1 | 4/2008 | Cho et al. |
| 2009/0079662 | A1 | 3/2009 | Takada et al. |
| 2009/0096758 | A1* | 4/2009 | Hotelling et al. ............. 345/173 |

FOREIGN PATENT DOCUMENTS

| JP | 2007-533044 | 11/2007 |
| JP | 2008-97609 | 4/2008 |
| JP | 2007-533044 | 5/2010 |
| KR | 10-2006-0021375 | 3/2006 |
| KR | 10-2007-0108200 | 11/2007 |
| KR | 10-2009-0028626 | 3/2009 |
| WO | WO 2005/114369 | 12/2005 |
| WO | WO 2007/130771 | 11/2007 |
| WO | WO 2007/146783 | 12/2007 |

* cited by examiner

*Primary Examiner* — Jonathan Boyd
(74) *Attorney, Agent, or Firm* — Antonelli, Terry, Stout & Kraus, LLP.

(57) ABSTRACT

A sensor apparatus for detecting contact or proximity of an object includes a calculation section for separating a plurality of points of the contact or the proximity that are generated simultaneously, and calculating individual sets of positional coordinates, and the calculation section includes an analysis section for determining, based on a spatial distribution of signal intensity obtained through detection, a condition for separating the spatial distribution of the signal intensity into a plurality of regions.

11 Claims, 16 Drawing Sheets

FIG.3A

Y COORDINATE

| | XP1 | XP2 | XP3 | XP4 | XP5 |
|---|---|---|---|---|---|
| YP5 | 10 | 12 | 12 | 13 | 11 |
| YP4 | 11 | 10 | 12 | 13 | 12 |
| YP3 | 12 | 13 | 13 | 12 | 12 |
| YP2 | 11 | 12 | 12 | 11 | 11 |
| YP1 | 11 | 12 | 13 | 12 | 10 |

X COORDINATE

FIG.3B

Y COORDINATE

| | XP1 | XP2 | XP3 | XP4 | XP5 |
|---|---|---|---|---|---|
| YP5 | 10 | 12 | 12 | 13 | 11 |
| YP4 | 11 | 10 | 12 | 13 | 12 |
| YP3 | 12 | 22 | 23 | 12 | 12 |
| YP2 | 11 | 22 | 22 | 11 | 11 |
| YP1 | 11 | 12 | 13 | 12 | 10 |

X COORDINATE

SENSING APPARATUS OF PROXIMITY AND CONTACT, AND DISPLAY DEVICES

CROSS-REFERENCE TO RELATED APPLICATION

The present application claims priority from Japanese application JP 2009-125382 filed on May 25, 2009, the content of which is hereby incorporated by reference into this application.

BACKGROUND OF THE INVENTION

1. Field of the Invention

The present invention relates to a sensor apparatus for detecting contact or proximity of an object (for example, touch sensor), and display devices with the same, and more particularly, to a sensor apparatus and display devices that are intended to achieve higher accuracy of coordinate detection.

2. Description of the Related Art

Display devices including an input apparatus having a function of input through touch operation with a finger or the like (hereinafter, referred to as touch sensor) are used for a portable electronic device, various kinds of home electric appliances, and a stationary customer guiding terminal such as an automatic reception machine. As a detection system for the touch sensor, there are known a resistive film system in which a change in resistance value caused by touch is detected, a capacitive coupling system in which a change in capacitance value is detected, an optical sensor system in which a change in light quantity caused by blocking light is detected, and the like.

In recent years, there have been an increasing number of devices that have a display device including the touch sensor installed therein, and at the same time, there has been increasing a demand for complex functions to be implemented in applications involving the use of the touch sensor. Therefore, a great deal of effort has been taken to expand the number of input points simultaneously detectable by the touch sensor, which has conventionally been a single point, to a plurality of points, in other words, to develop a technology for attaining a multi-touch sensor.

JP 2007-533044 A may be taken as a prior art example that relates to the multi-touch sensor. In the technology disclosed in the prior art example, the capacitive coupling system is employed as the detection system for the touch sensor. The capacitive coupling system is a system in which information obtained by the touch sensor is processed, to thereby individually calculate coordinates of a plurality of input points that are input simultaneously. The touch sensor includes a plurality of X electrodes and a plurality of Y electrodes. The plurality of X electrodes and the plurality of Y electrodes are formed on different layers that are electrically insulated from each other. The plurality of X electrodes each correspond to an X coordinate while the plurality of Y electrodes each correspond to a Y coordinate. Intersections between the plurality of X electrodes and the plurality of Y electrodes serve as detection points in the Cartesian coordinate system. When a conductor such as a finger is brought into contact with the touch sensor, at an intersection between electrodes located in the vicinity of the contact point, a capacitive circuit, in which the X electrode and the Y electrode are coupled to each other via the finger surface, is formed. The capacitive circuit holds a parallel connection to capacitance between the electrodes in a case where there is no contact of the conductor, and as a result, the capacitance between the electrodes increases. In this manner, the increase/decrease in capacitance caused by contact of the detection target object is detected at each intersection between the electrodes, to thereby perform coordinate detection. More specifically, one of the Y electrodes is selected, at which a voltage signal is input, and the signal transmitted so as to be proportional to the capacitance at the intersections between the electrodes is detected at the X electrodes. This step is repeated sequentially for all the Y electrodes, to thereby obtain information on the capacitance at all the intersections in the XY plane. The prior art example describes procedures for calculating coordinates based on the information thus obtained as follows. Four major procedures are provided and are described as follows. (Procedure 1) A detection signal distribution is filtered so as to remove noise. (Procedure 2) Gradient data of the detection signal intensity distribution is generated. (Procedure 3) Boundaries are calculated in the distribution including many input points based on the above-mentioned calculated gradient data. (Procedure 4) Coordinates of each region obtained by separation with the above-mentioned boundaries are calculated.

The processing of Procedure 2 and Procedure 3 in the above-mentioned example is unique to the multi-touch sensor. This is because, as described above, the multi-touch sensor needs to determine a plurality of input points, which are input simultaneously at different positions, as distinct input points. The prior art example discloses that a watershed algorithm is used particularly for Procedure 3, in which the boundaries to be used for determining the input points are calculated. The watershed algorithm is processing of setting markers at minimum points of the gradient of the detection signal intensity distribution obtained in Procedure 2, expanding the markers toward the higher points of the gradient, setting a position at which the markers meet as a boundary line for separating the detection signal distribution, and regarding a region defined thereby as a group.

The above-mentioned prior art example discloses such a signal detection method and processing method for the detection signals as described above, which are used for implementing functions as the multi-touch sensor.

SUMMARY OF THE INVENTION

In recent years, there has also been increasing a demand for a multi-touch sensor that supports more accurate multipoint simultaneous input, for example, multipoint simultaneous input using a stylus pen or the like. In the above-mentioned prior art example, a finger is assumed as major input means. The finger input generally has the following characteristics. First, fine position input is less necessary because the range of the input point is large due to a large contact area of the fingertip. Further, there is a low frequency of a case where the distance between a plurality of input points is extremely small, that is, there is a high frequency of a case where the distance between input points is sufficiently large, because of the finger input.

Meanwhile, if it is assumed that a stylus pen or the like is used for input, there are required opposite characteristics to those in the case of the finger. That is, the following characteristics are required. Fine position indication is made because of a sufficiently small area of the pen tip, and input point determination is required also in a case where the pen tips become extremely close to each other. Needless to say, it is desired that more accurate input point determination be performed not only in the case of multipoint simultaneous input using a stylus pen or the like but also in a case of multipoint simultaneous input using a plurality of fingers and in a case of multipoint simultaneous input using a finger and a stylus pen or the like.

An object of the present invention is to achieve, in a sensor apparatus for detecting contact or proximity of an object, determination of input points even under a state in which an overlap is found in a distribution of detection signals respectively indicating a plurality of input points.

In order to achieve the above-mentioned object, the present invention provides a processing step for facilitating separation of adjacent input points to a processing step of calculating coordinates of each input point based on a detection signal distribution. Further, the processing step is implemented with simple procedures, and under a condition that increase in scale of a processing circuit and the like can be suppressed.

According to the present invention, the sensor apparatus for detecting contact or proximity of an object, which is capable of highly accurate coordinate calculation irrespective of a distance between input points even for multipoint input, is attained.

BRIEF DESCRIPTION OF THE DRAWINGS

FIGS. 3A and 3B Explanatory diagrams each illustrating an example of detection signals.

DETAILED DESCRIPTION OF THE INVENTION

First, referring to FIGS. 1 to 5, description is given of an example of a configuration of a detection system and an example of processing procedures in a conventional technology.

Figure 1:
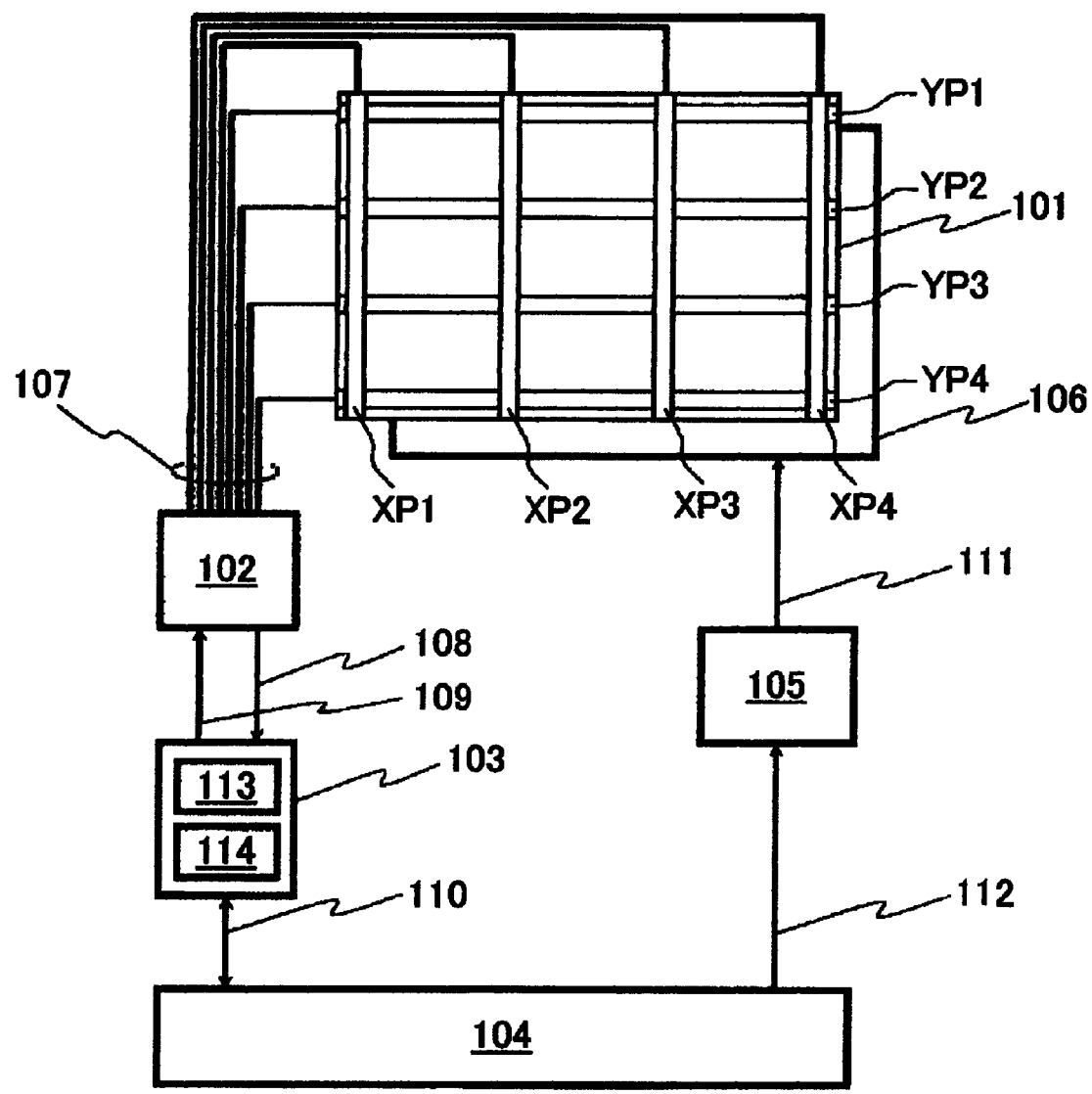
FIG. 1 An explanatory diagram illustrating a configuration of a display device having a touch sensor.

FIG. 1 is an explanatory diagram illustrating a configuration of a display device including a multi-touch sensor.

In FIG. 1, a multi-touch sensor is represented by reference numeral 101. The multi-touch sensor 101 includes X electrodes XP and Y electrodes YP, which are used for capacitance detection. In FIG. 1, the multi-touch sensor 101 includes four X electrodes (XP1 to XP4) and four Y electrodes (YP1 to YP4), but the numbers of the electrodes are not limited thereto. The multi-touch sensor 101 is installed on a top surface of a display device 106. The X electrodes XP and the Y electrodes YP of the multi-touch sensor 101 are connected to a capacitance detection section 102 via detection wiring lines 107. The capacitance detection section 102 is controlled based on a detection control signal 109 output from a control section 113 included in a control/calculation section 103. Under the control based thereon, the capacitance detection section 102 detects capacitance between the electrodes formed in the multi-touch sensor 101, and outputs, to the control/calculation section 103, a capacitance detection signal 108 that varies depending on a value of the capacitance between the electrodes. A calculation section 114 included in the control/calculation section 103 calculates a signal component between the electrodes based on the capacitance detection signal 108 between the electrodes, and determines detection coordinates through calculation based on the signal component between the electrodes. The control/calculation section 103 uses an I/F signal 110 to transfer the detection coordinates to a system 104. When the system 104 receives the detection coordinates 110, which are obtained by the multi-touch sensor 101 through input by contact or the like, the system 104 generates a display image based on the input operation, and transfers the display image as a display control signal 112 to a display control circuit 105. The display control circuit 105 generates a display signal 111 based on the display image transferred as the display control signal 112, and displays an image on the display device 106.

Figure 2:
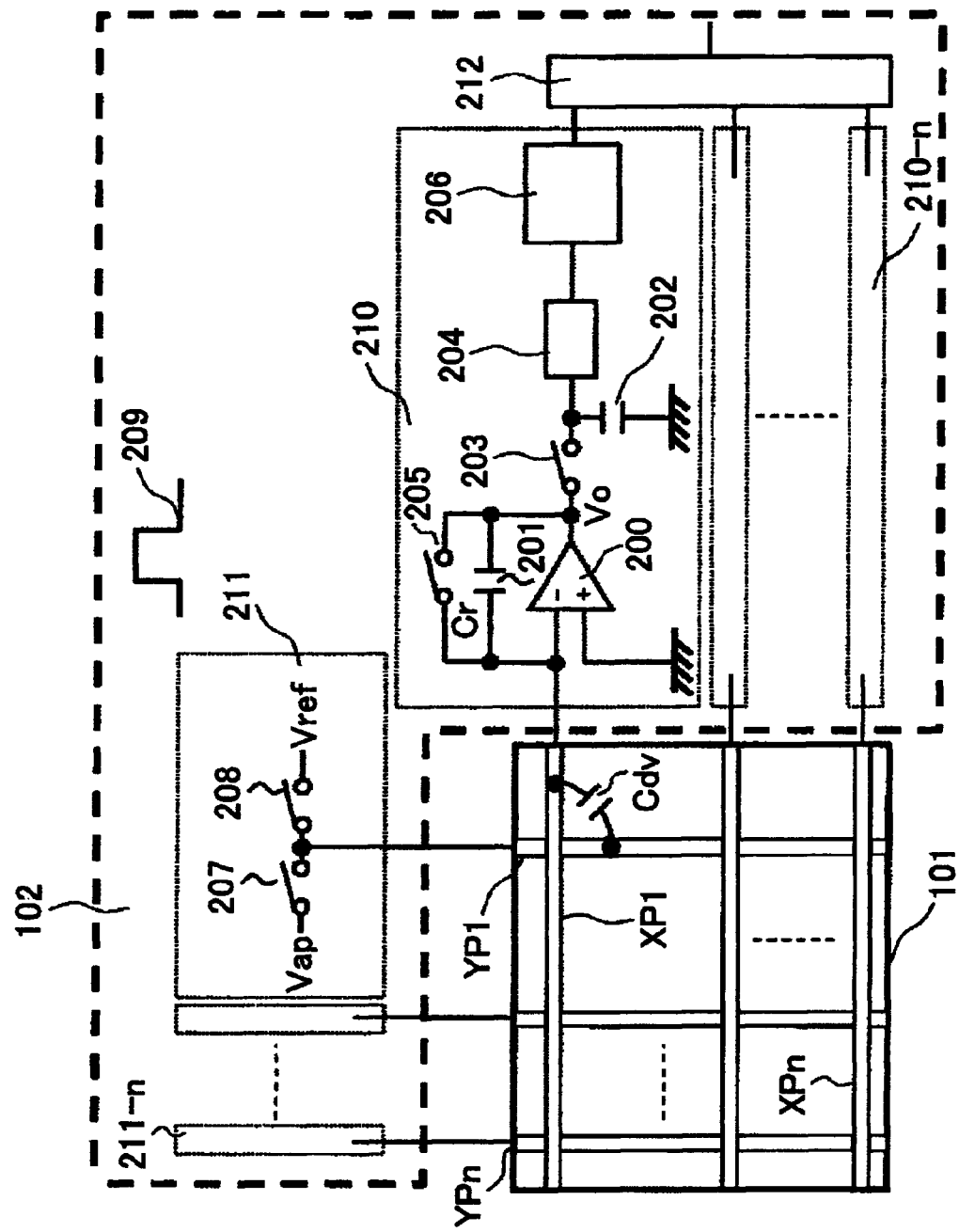
FIG. 2 An explanatory diagram illustrating an example of structure of a capacitance detection section.

FIG. 2 is a diagram illustrating a detailed example of structure of the above-mentioned capacitance detection section 102. The structure for capacitance detection is not limited to the structure of FIG. 2. In this example, the capacitance detection section 102 includes a signal input section 211 for inputting a signal to the Y electrode, a signal reading section 210 for reading a signal from the X electrode, and a memory section 212.

FIG. 2 illustrates circuit structure of a pair of the signal reading section 210 corresponding to the X electrode XP1 and the signal input section 211 corresponding to the Y electrode YP1, but signal reading sections 210-$n$ and signal input sections 211-$n$ each having the same structure are respectively connected to X electrodes XPn and Y electrodes YPn that are formed in the multi-touch sensor 101.

The signal input section 211 selectively supplies, to the Y electrode YP, one of reference potentials Vap and Vref through switching between switches 207 and 208. A waveform 209 indicates the voltage applied to the Y electrode YP.

The signal reading section 210 includes: an integral circuit constituted by an operational amplifier 200, an integral capacitor (Cr) 201, and a reset switch 205; a sample hold circuit constituted by a sample switch 203 and a hold capacitor 202; a voltage buffer 204; and an analog-digital converter 206.

Hereinbelow, description is given of an overview of operation of the capacitance detection section 102. The description is given below on the assumption that the integral capacitor 201 is not charged in an initial state of the capacitance detection section.

Starting from the initial state, the above-mentioned signal input section 211 first applies the voltage Vap to the Y electrode YP1. Accordingly, coupled capacitance Cdv between the X electrode and the Y electrode is charged to the extent that the voltage of the Y electrode YP1 reaches the applied voltage Vap. At this time, the potential of the X electrode XP1 is always fixed to a reference potential (in this example, ground potential) due to a negative feedback effect of the operational amplifier 200. Thus, a current generated through the charging flows into an output terminal of the operational amplifier 200 via the integral capacitor 201. An output voltage V0 of the integral circuit, which is obtained through this operation, depends on Cdv, which corresponds to the level of the coupled capacitance between the X electrode and the Y electrode. In this case, Vo is −Vap(Cdv/Cr). Subsequently, the sample switch 203 of the sample hold circuit is turned on, and is controlled so as to be turned off after a lapse of a predetermined period of time. Accordingly, the hold capacitor 202 holds the output potential Vo of the integral circuit, which is determined through the previous operation. The held potential is input to the analog-digital converter 206 via the voltage buffer 204, and the held potential is then converted into digital data.

The signal reading sections 210 connected to the X electrodes XP other than the above-mentioned X electrode XP1 also perform the same operation as the signal reading section 210 connected to the electrode XP1. The output potential of the integral circuit determined based on the input signal from the Y electrode YP1 is read simultaneously with the output potential of the X electrode XP1.

The above-mentioned output from the signal reading section 210 connected to each X electrode XP is input to the memory section 212. Output data from the signal reading section 210 is held in the memory section 212. The memory section 212 exchanges data held therein with the calculation/control section 103 illustrated in FIG. 1.

Subsequently to the detection with the above-mentioned YP1 as the input, a voltage is applied to the Y electrode YP other than the above-mentioned Y electrode YP1 for capacitance detection. Prior to the capacitance detection, the reset switch 205 is subjected to ON/OFF control, to thereby reset the integral capacitor 201 of each the integral circuit. The same detection operation is repeated from then on.

FIGS. 3A and 3B are diagrams each illustrating, for each of the coordinates of the multi-touch sensor 101, an example of detection data held in the above-mentioned memory section 212 in a state in which the detection has been completed over the entire surface of the multi-touch sensor 101 following the above-mentioned detection procedures. Each square 300 represents a detection point on the multi-touch sensor 101, and a numerical value 301 within the square represents detection data. Hereinafter, the description is given on the assumption that, if there is input to the multi-touch sensor 101, the numerical value increases at the input point. FIG. 3A illustrates an example of detection data in a case where there is no input to the multi-touch sensor 101. Numerical values within the squares are substantially uniform. On the other hand, FIG. 3B illustrates an example in a case where there is input to the multi-touch sensor 101. Detection data pieces corresponding to intersections between XP2 and XP3 and YP2 and YP3 are larger in value than those in the case of no input. As described above, the no-input state is set as reference, and if there exists detection data larger in value than that in the no-input state, it is determined that there is input, to thereby calculate coordinates of the input point.

Figure 4A:
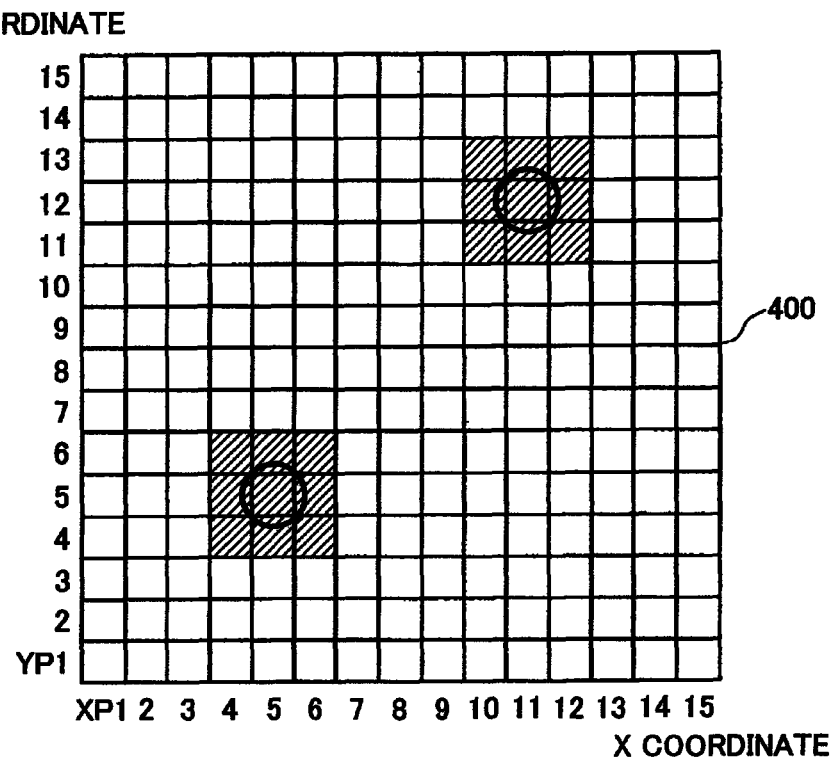
FIGS. 4A and 4B Explanatory diagrams each illustrating an example of detection signals at a time of multipoint input.
Figure 4B:
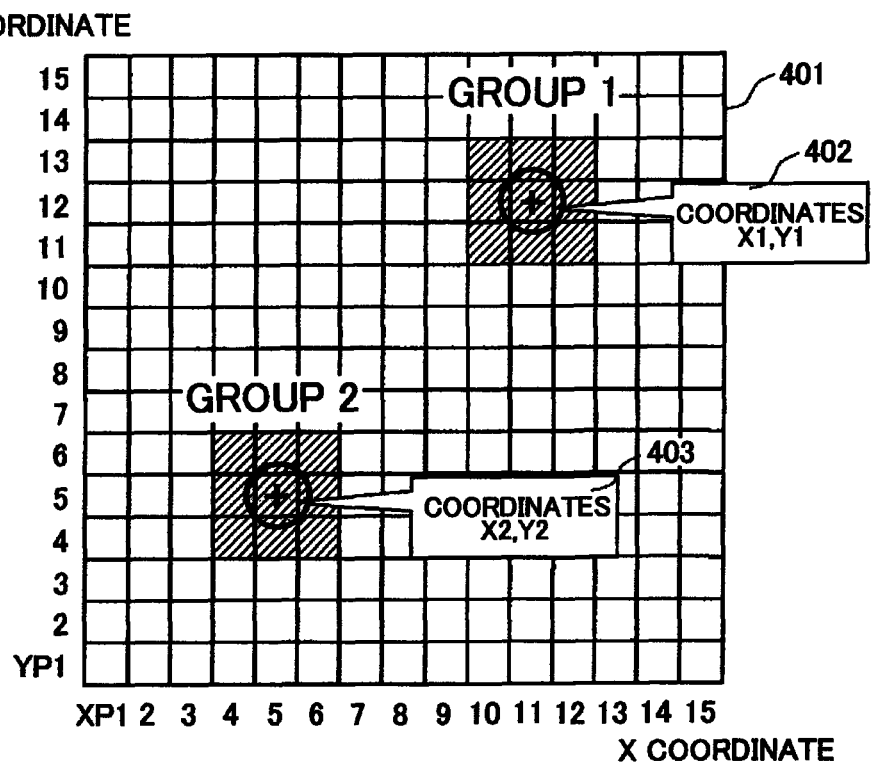

FIGS. 4A and 4B each illustrate an example of a case where a plurality of input points that are input simultaneously are detected by the above-mentioned multi-touch sensor 101. In this example, it is assumed that the X coordinate and the Y coordinate are defined by fifteen electrodes, respectively. Further, a square 400 represents a detection point on the multi-touch sensor 101 similarly to the above, and a point at which detection data increases in value through the input than in the case of no input is represented by a hatched square while a point with no input is represented by an unhatched square. As illustrated in FIG. 4A, if there are two input points indicated by circled coordinates (X,Y)=(5,5) and (X,Y)=(11,12), large detection signals are generated at a plurality of coordinates including those of the input points. The detection data thus obtained is grouped as illustrated in FIG. 4B, and coordinates 402 and 403 are calculated for the respective groups.

Figure 5A:
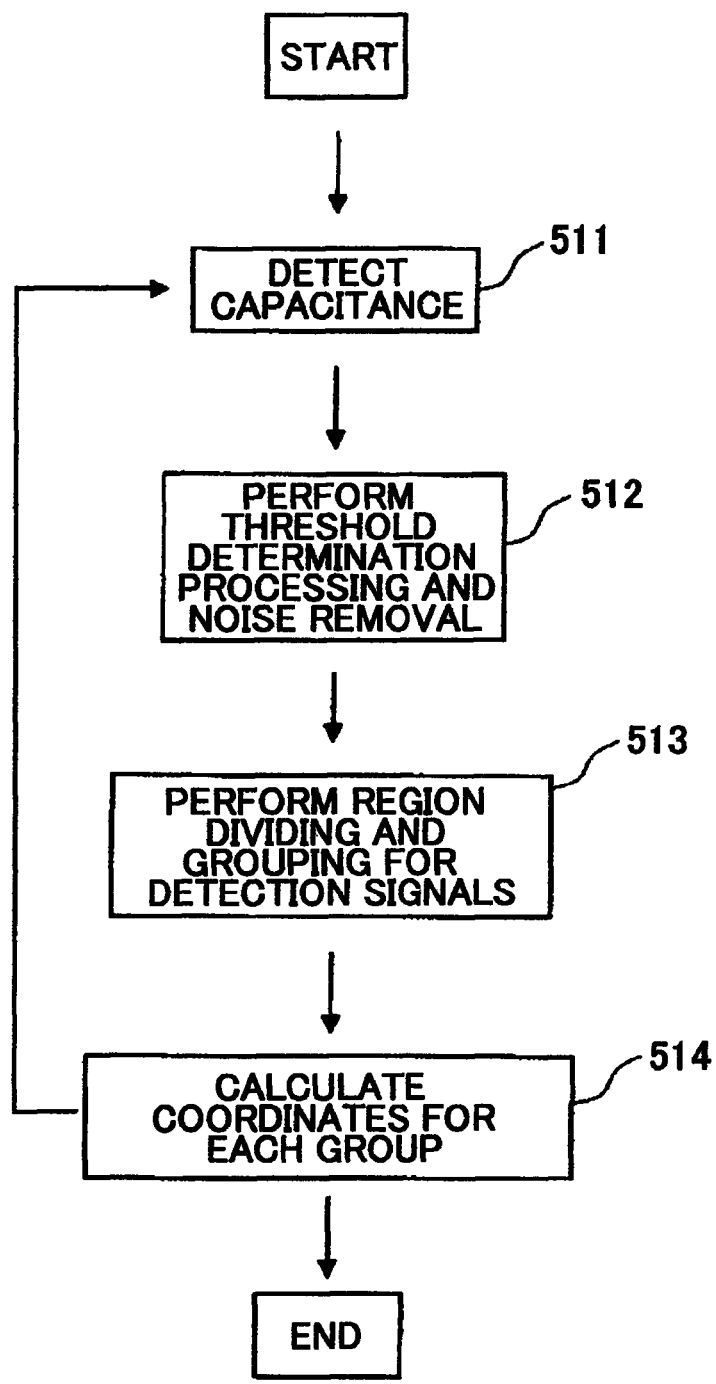
FIGS. 5A and 5B Explanatory diagrams each illustrating conventional processing procedures.
Figure 5B:
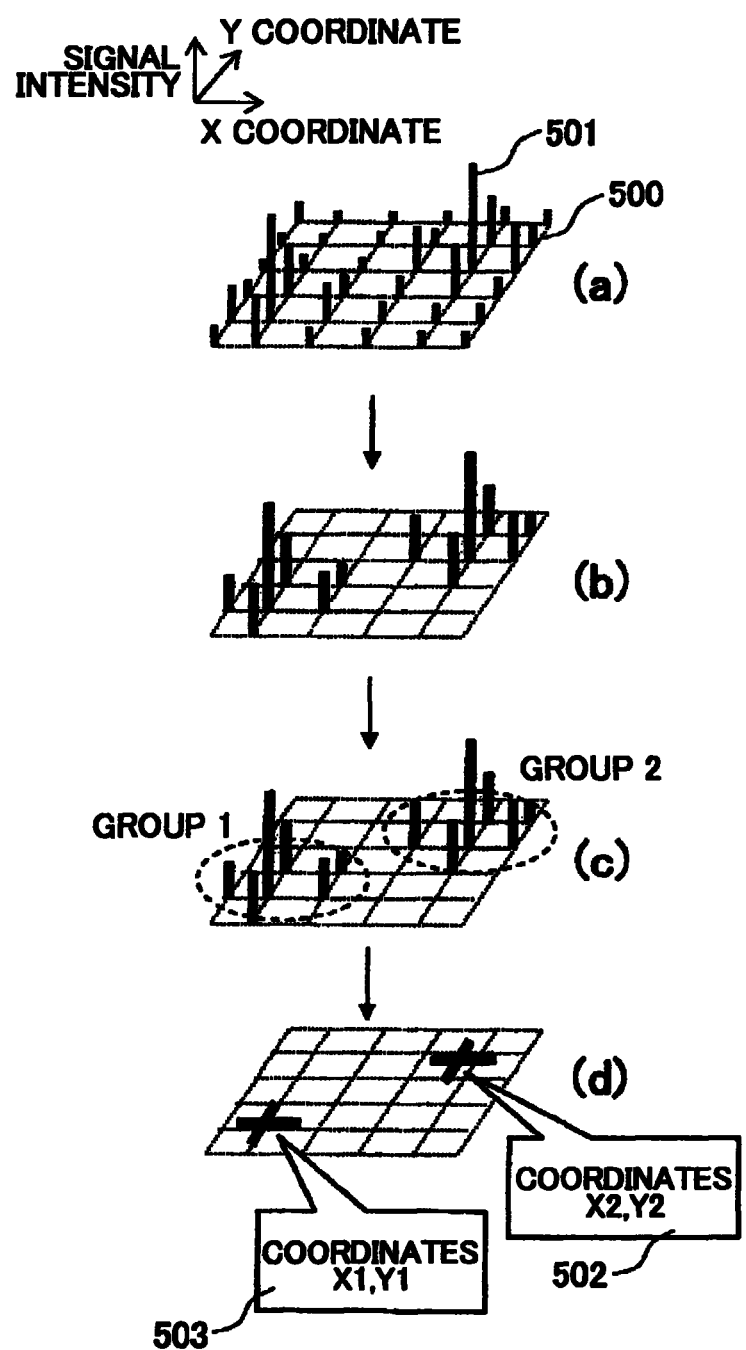

FIGS. 5A and 5B are diagrams each illustrating an example of data processing procedures at the time when a plurality of input points that are input simultaneously are detected by the multi-touch sensor 101 as described with reference to FIG. 4. First, when capacitance detection 511 has been completed over the entire surface of the multi-touch sensor 101, a distribution of detection signal intensity 501 with respect to XY two-dimensional coordinates 500 is obtained as illustrated in Part (a) of FIG. 5B. In Part (a) of FIG. 5B, the signal intensity 501 corresponding to an input state is generated at each point of the XY two-dimensional coordinates 500. The two-dimensional data is subjected to threshold processing (noise processing) 512. This processing corresponds to a step of removing noise and offset values by setting a threshold for determining validity of data, and by keeping only data having a value equal to or larger than the threshold. As a result, the distribution of the detection signal intensity 501 changes from one illustrated in Part (a) of FIG. 5B to one illustrated in Part (b) of FIG. 5B. Subsequently, the detection signal distribution obtained in the above-mentioned step is subjected to region dividing and grouping for the detection signals (Step 513). In this step, through an analysis of relevance among the data pieces that form the detection signal intensity distribution at this time, it is determined whether or not the signals originate from a common input point. Further, in this step, the data existing region is divided, and the resultant regions are grouped on a basis of data originating from the common input point. Specific methods thereof include a watershed method in which an inclination of the signal intensity is analyzed, and labeling processing focusing on continuity of data existing points. However, the present invention is not limited to those methods. Through this step, the detection signal intensity distribution is divided into two groups (groups 1 and 2) originating from distinct input points as illustrated in Part (c) of FIG. 5B. Subsequently, coordinates are calculated for each group (Step 514). In this step, various methods for defining the coordinates (calculation methods) may be used, such as, methods based on the center of the distribution and the barycenter thereof, but the definition may be made arbitrarily. Through calculation based on any one of the definitions, coordinates 502 and 503 are obtained in the example of Part (d) of FIG. 5B.

Through the configuration and processing procedures described above, it is possible to obtain the input coordinates of each of the plurality of input points based on the detection signals from the multi-touch sensor.

Figure 6A:
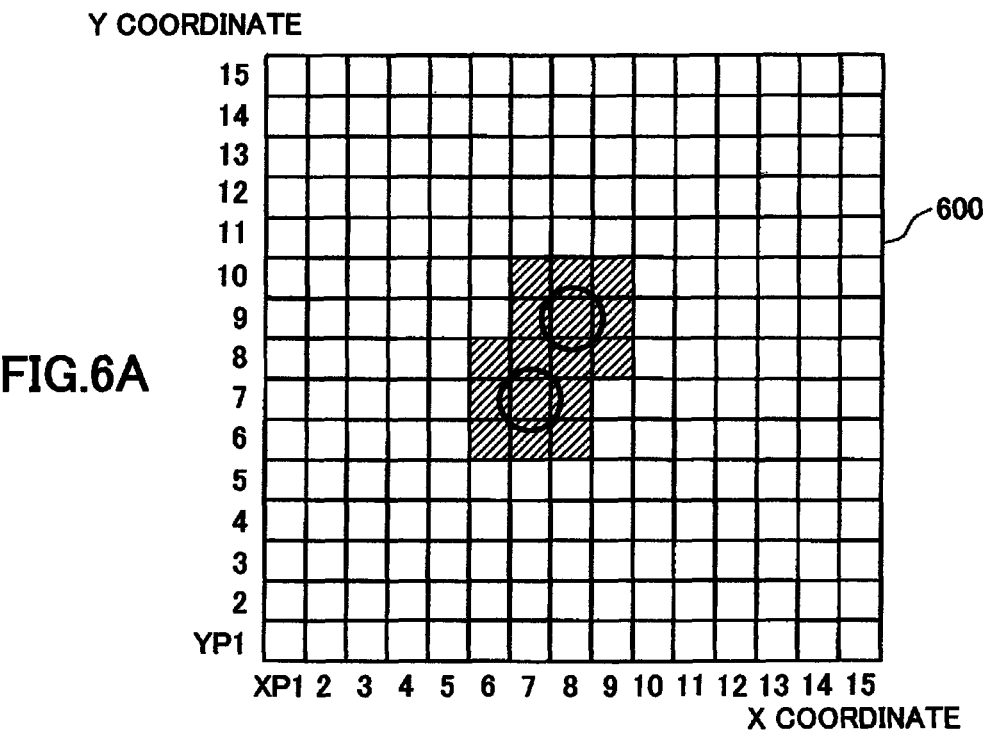
FIGS. 6A and 6B Explanatory diagrams each illustrating detection signals at a time of input to two adjacent points.
Figure 6B:
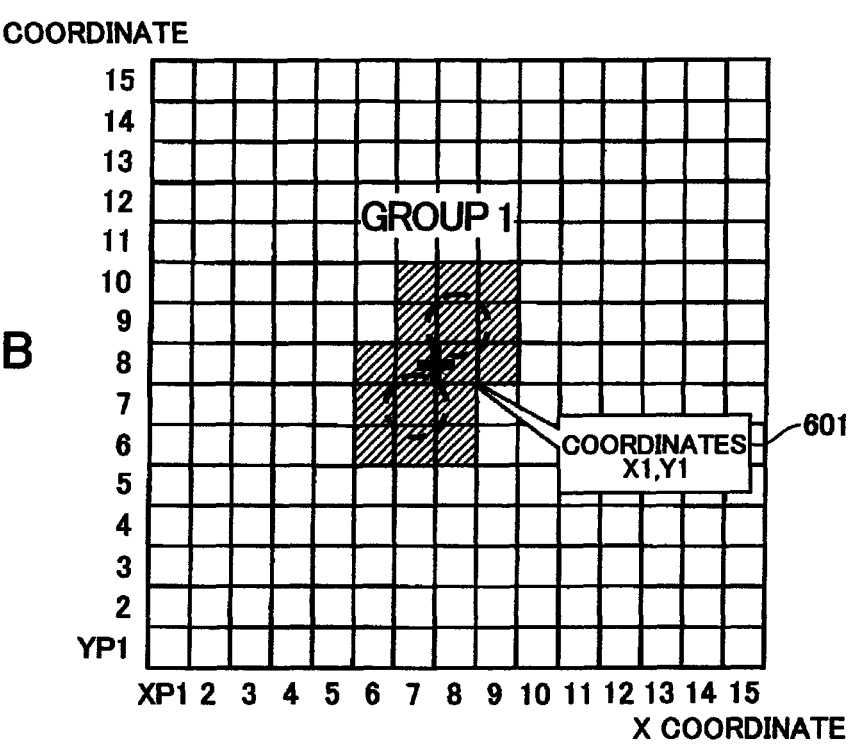

However, in a case where the input points are adjacent to each other as illustrated in FIGS. 6A and 6B, there arises a problem that the input points cannot be separated from each other as independent points. FIG. 6A illustrates an example of inputs to two adjacent points of the multi-touch sensor 101. Circles of FIG. 6A represent input points, and signals are generated in a plurality of regions including the input points (hatched squares). It should be noted that a detection signal distribution illustrated in FIGS. 6A and 6B is the detection signal distribution obtained after the threshold processing (noise processing) 512. In squares having detection signal intensity equal to or smaller than the threshold, the signal intensity is removed and indicates 0 (unhatched squares). When the detection signal distribution is subjected to the region dividing and grouping 513 for the detection signals of the processing procedures, the detection signal distribution is recognized as a single group as illustrated in FIG. 6B because an overlap is found among the signals, resulting in calculation of a single set of coordinates 601 alone.

Figure 7A:
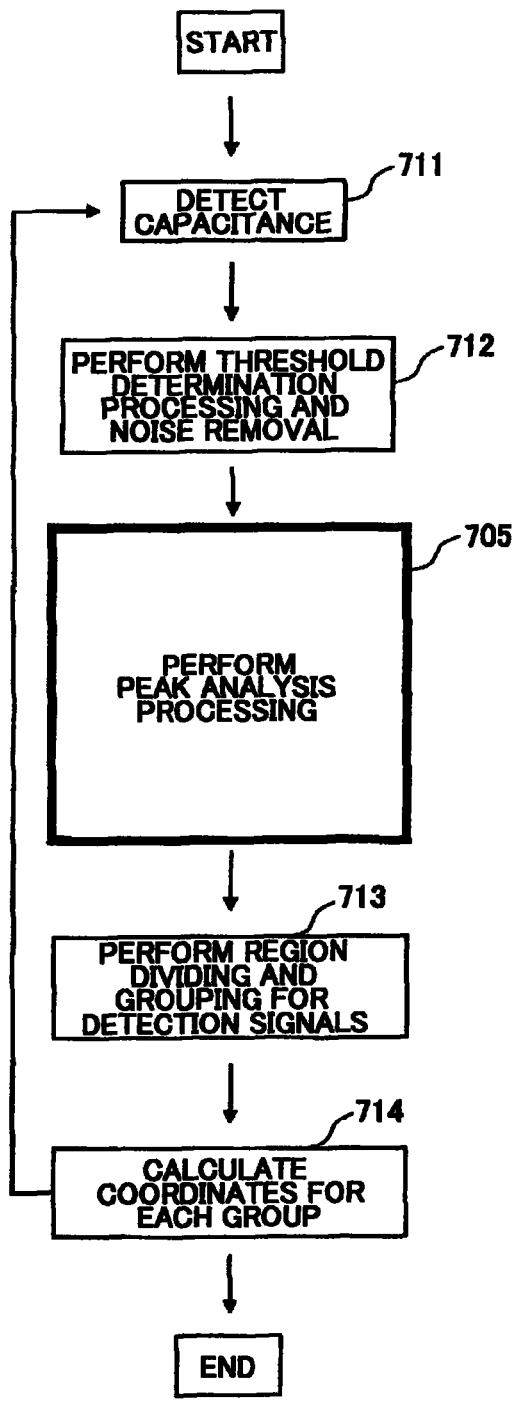
FIGS. 7A and 7B Explanatory diagrams each illustrating processing procedures according to an embodiment of the present invention.
Figure 7B:
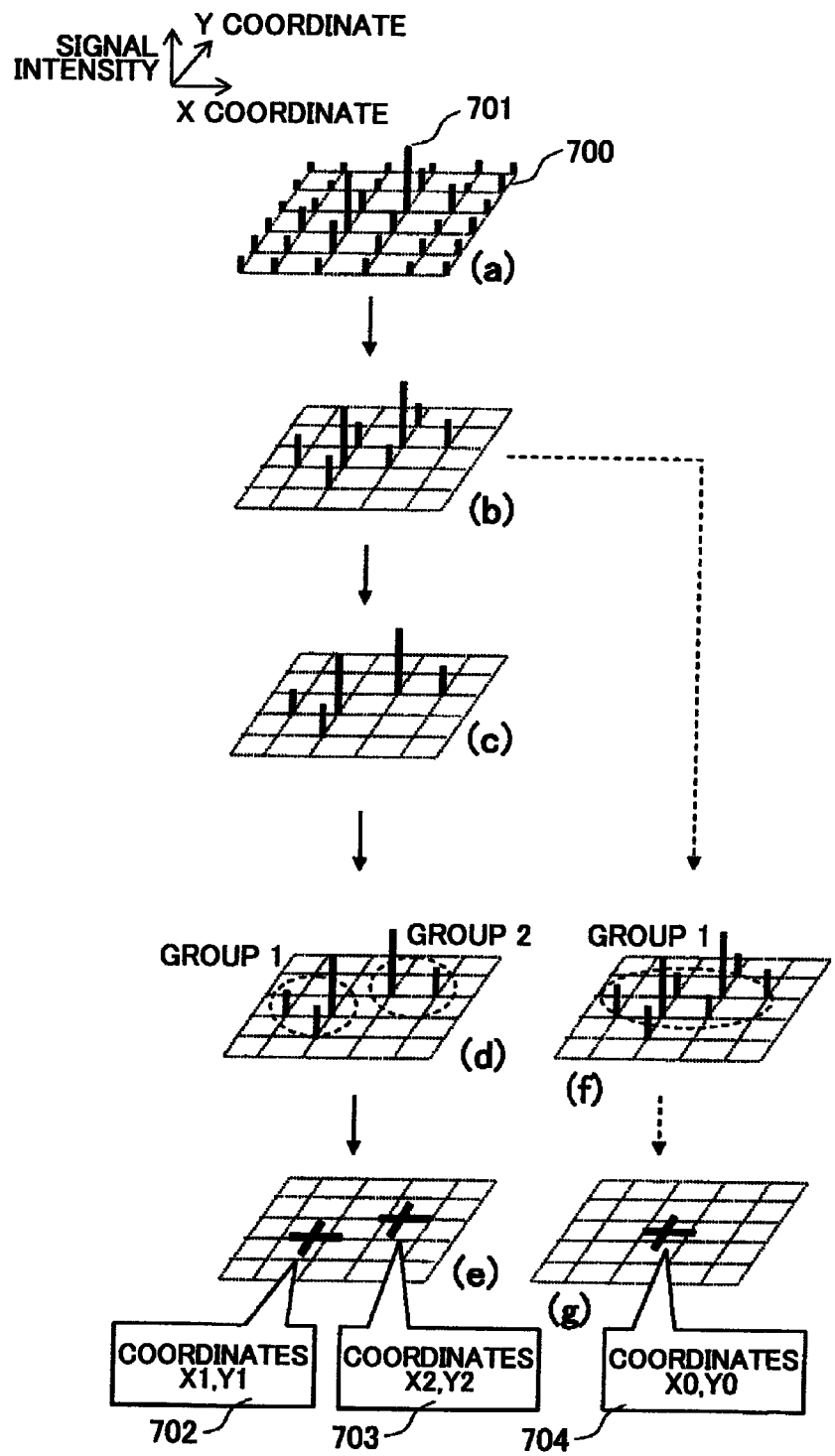

FIGS. 7A and 7B are explanatory diagrams each illustrating processing procedures according to an embodiment of the present invention. In FIG. 7A, Steps 711 to 714 are the same as Steps 511 to 514 of FIG. 5A, respectively. The processing procedures according to the embodiment of the present invention further include peak analysis processing 705 as compared with the processing procedures illustrated in FIG. 5A. In this case, the capacitance detection 711 is performed by the capacitance detection section 102 under the control by the control section 113 included in the control/calculation section 103 of FIG. 1. The threshold determination processing (noise removal) 712, the peak analysis processing 705, the region dividing and grouping 713 for the detection signals, and the group-based coordinate calculation 714 are performed by the calculation section 114 included in the control/calculation section 103 of FIG. 1.

In the case of inputs to two adjacent points as illustrated in FIG. 6A, the detection signal intensity distribution is as illustrated in Part (a) of FIG. 7B. This detection signal intensity distribution is subjected to the threshold determination processing and noise removal processing 712 similarly to the above-mentioned conventional processing method (Step 512). Accordingly, signals having values equal to or smaller than the threshold are removed, to thereby obtain a detection signal intensity distribution as illustrated in Part (b) of FIG. 7B. In the conventional processing method, the detection signal intensity distribution is subjected to region dividing and grouping. In this case, as illustrated in Part (f) of FIG. 7B, it is determined that there is a single group, irrespective of the fact that there are two input points. As a result, as illustrated in Part (g) of FIG. 7B, a single set of coordinates 704 alone is calculated.

In contrast, in the processing method according to the embodiment of the present invention, the detection signal intensity distribution obtained in Step 712 is subjected to the peak analysis processing 705. In the peak analysis processing 705, based on the result of the above-mentioned threshold determination processing (noise removal) 712, the structure of the signal distribution is analyzed to determine whether or not there are any dividable peaks.

The distribution illustrated in Part (b) of FIG. 7B may be divided by setting the threshold slightly higher in the processing similar to the above-mentioned threshold determination processing. The signal distribution illustrated in Part (c) of FIG. 7B, which is obtained through the peak analysis processing 705, is subjected to the region dividing and grouping 713 for the detection signals. The distribution may accordingly be grouped into two groups. As a result, two sets of coordinates 702 and 703 are obtained.

The calculation section 114 of the touch sensor according to the embodiment of the present invention is obtained by adding, to the calculation section of the conventional touch sensor, an analysis section for performing the peak analysis processing 705. Based on a spatial distribution of signal intensity obtained through the capacitance detection 711, the analysis section determines a condition for separating the spatial distribution of signal intensity into a plurality of regions.

In FIG. 7A, the threshold determination processing (noise removal) 712 is performed after the capacitance detection 711, followed by the peak analysis processing 705, but the threshold determination processing (noise removal) 712 may be omitted and the peak analysis processing 705 may be performed after the capacitance detection 711. Further, the description has been given by taking the capacitance detection touch sensor as an example in the above-mentioned embodiment of the present invention, but in general, the sensor apparatus may be any sensor apparatus for detecting contact or proximity of an object, in which the analysis section for performing the peak analysis processing 705 is added to the calculation section for separating a plurality of points of contact or proximity that are generated simultaneously, and calculating individual sets of positional coordinates.

Hereinbelow, description is given in more detail of the peak analysis processing 705 according to the embodiment of the present invention by way of examples.

Example 1

Example 1 of the present invention is, described below with reference to FIGS. 8, 9, and 10.

Figure 8:
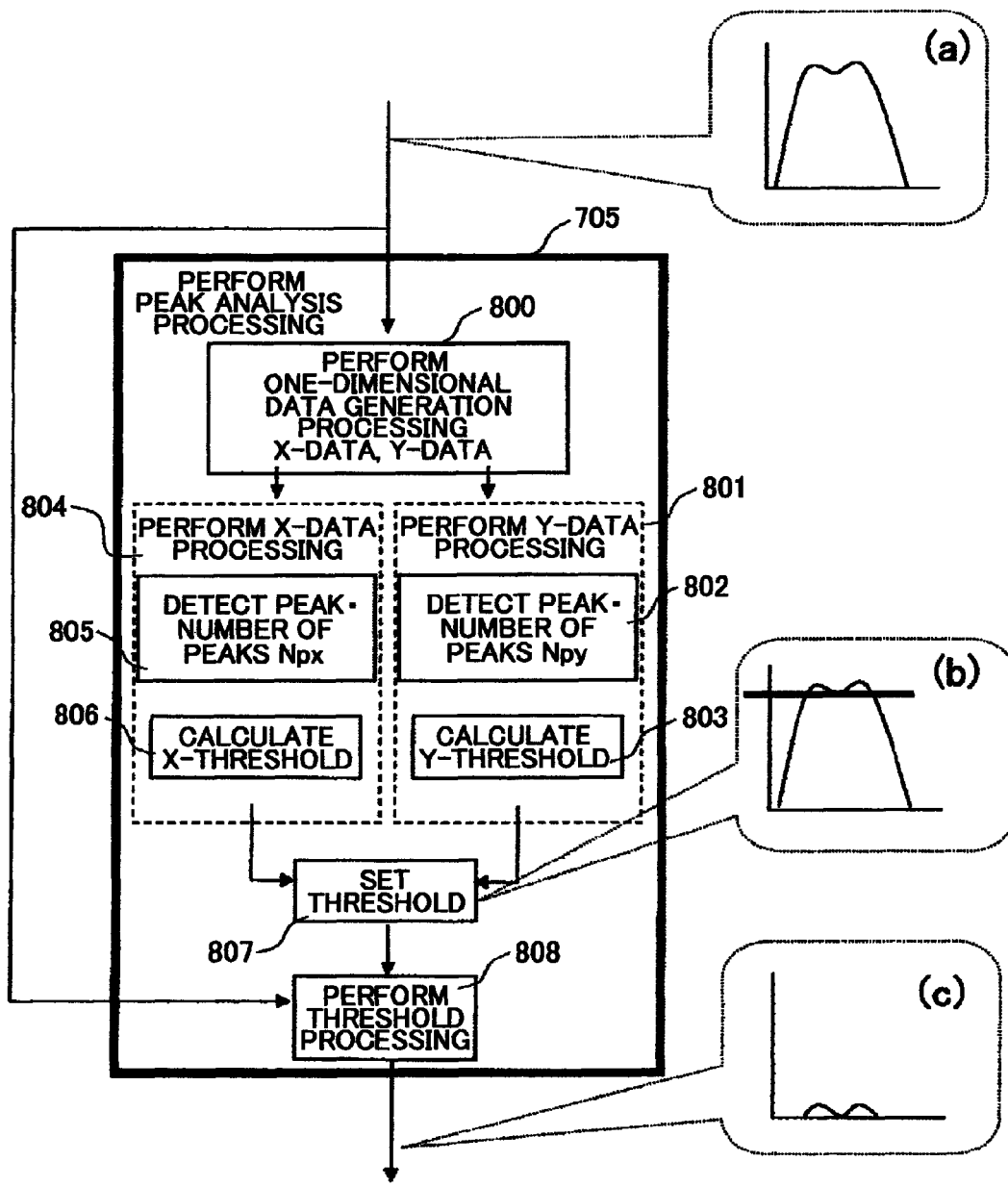
FIG. 8 An explanatory diagram illustrating details of Example 1.

FIG. 8 is an explanatory diagram illustrating Example 1 of the present invention. In this example, the above-mentioned peak analysis processing 705 includes one-dimensional data generation processing 800, X-data processing 804, Y-data processing 801, threshold setting 807, and threshold processing 808. The X-data processing 804 includes peak detection 805 and X-threshold calculation 806. The Y-data processing 801 includes peak detection 802 and Y-threshold calculation 803.

First, in the one-dimensional data generation processing 800, orthogonal projection of the distribution of signal intensity illustrated in Part (b) of FIG. 7B is performed with respect to the X-axis and the Y-axis. Accordingly, the two-dimensional distribution illustrated in Part (b) of FIG. 7B is converted into two one-dimensional distributions on the X-axis and the Y-axis. At this time, there is no loss of information on the peaks held in the two-dimensional distribution.

Subsequently, the data pieces of the one-dimensional distributions on the X-axis and the Y-axis, which are generated through the above-mentioned one-dimensional data generation processing 800, are processed in the X-data processing 804 and the Y-data processing 801, respectively. At this stage, the peak detection 805 and the peak detection 802 are first performed to analyze the one-dimensional data distributions. There are various methods for the peak detection, and any one method may be employed there among. Based on results of the peak detection 805 and the peak detection 802, calculation is performed as to how many peaks exist in the data pieces of the one-dimensional distributions on the X-axis and the Y-axis, respectively, and further, information on the peaks, such as a minimum value between the peaks, is calculated. Subsequently, the X-threshold calculation 806 and the Y-threshold calculation 803 are executed, respectively. In those steps, optimum thresholds are calculated respectively regarding the X-axis data and the Y-axis data, based on the peak information on the data pieces of the one-dimensional distributions on the X-axis and the Y-axis, which is obtained through the above-mentioned peak detection. In this case, the optimum threshold is defined so that the number of separable peaks becomes maximum for each of the X-axis data and the Y-axis data. As a method for obtaining the optimum condition, there is provided as an example a method of selecting an intermediate value of the minimum value and the maximum value among the above-mentioned peaks as a threshold. Optimum thresholds are selected for the X-axis data and the Y-axis data, respectively, through the steps followed thus far. Subsequently, in the threshold setting 807, the threshold for the X-axis data and the threshold for the Y-axis data are, for example, compared with each other in consideration of the above-mentioned peak information, to thereby set a final threshold. Specifically, for example, a threshold regarding axis data having a larger number of separable peaks is prioritized, or a threshold regarding axis data having a smaller value thereof is prioritized. Finally, the final threshold determined in the threshold setting 807 is applied to the original two-dimensional distribution.

Waveforms illustrated in Part (a), Part (b), and Part (c) of FIG. 8 indicate changes of the distribution data (for simplicity of the description, images of the one-dimensional distribution are adopted) at the respective processing stages. At the stage of input to the peak analysis processing 705, the distribution data indicates a slight separation as in the waveform illustrated in Part (a). After the processings described thus far are performed in the peak analysis processing 705, by the time of the stage of the threshold setting 807, a threshold for extracting the slight separation is set as in the waveform illustrated in Part (b). The input distribution illustrated in Part (a) is processed again based on the threshold in the threshold processing 808, to thereby obtain the distribution waveform illustrated in Part (c).

Figure 9A:
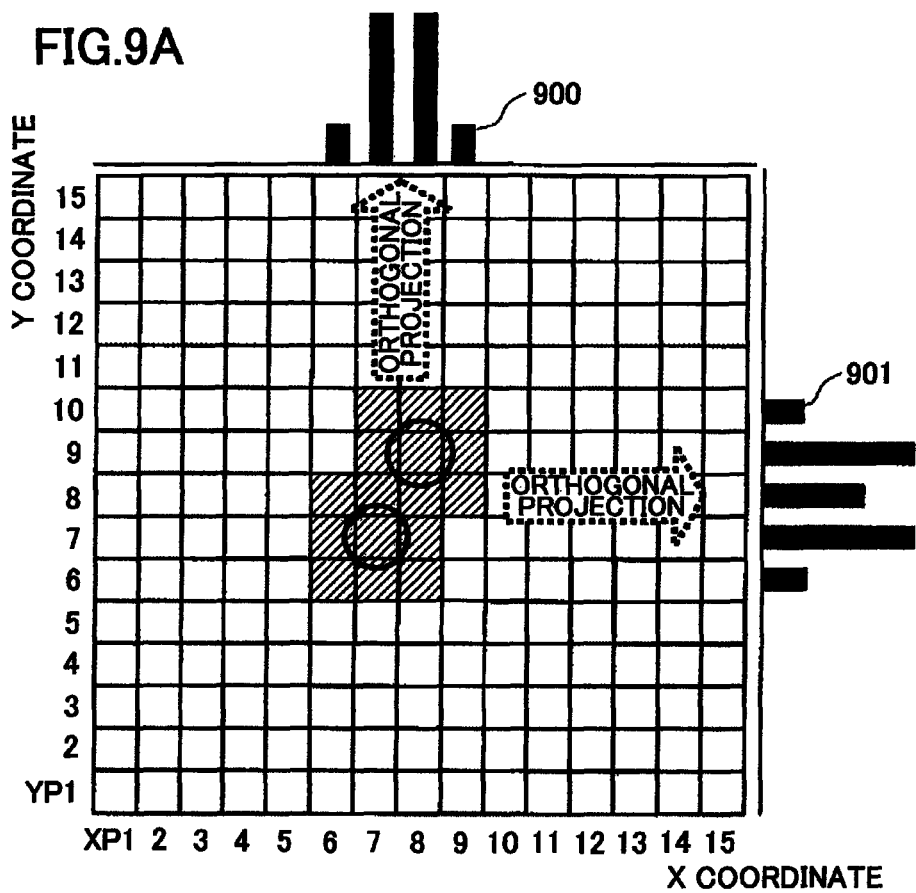
FIGS. 9A, 9B, and 9C Explanatory diagrams each illustrating processing contents of Example 1.
Figure 9B:
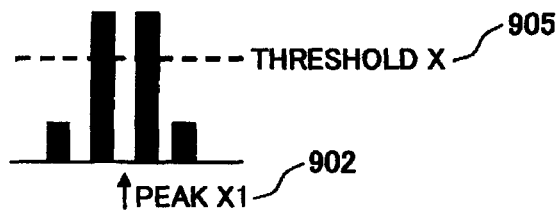
Figure 9C:
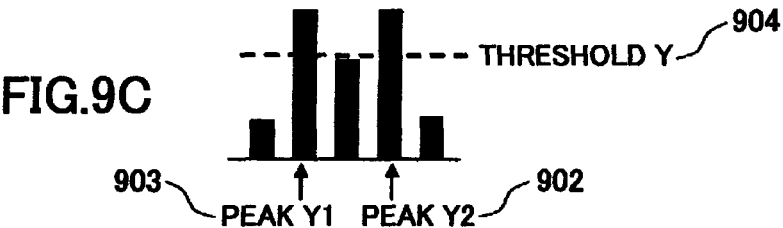

FIGS. 9A to 9C are explanatory diagrams each illustrating the above-mentioned peak analysis processing from the viewpoint of data.

FIG. 9A illustrates a process of the one-dimensional data generation processing 800. Through this processing, the orthogonal projection of the two-dimensional distribution is performed onto the X-axis and the Y-axis, respectively, and the two-dimensional distribution is converted into one-dimensional data 900 and one-dimensional data 901. FIGS. 9B and 9C respectively illustrate peak detection processing for the one-dimensional data 900 and the one-dimensional data 901, which are obtained through the above-mentioned one-dimensional data generation processing 800. FIG. 9B illustrates the one-dimensional data on the X-axis representing a distribution in which a single peak 902 is formed as a whole. On the other hand, the one-dimensional data on the Y-axis illustrated in FIG. 9C represents a distribution having two peaks 903 and 902. As an optimum threshold for dividing the two peaks 902 and 903, the minimum value between both the peaks 902 and 903 is set as a threshold Y 904. Finally, the threshold regarding the Y-axis having a larger number of separable peaks is prioritized in the threshold setting. Thus, the threshold 904 is set.

Figure 10A:
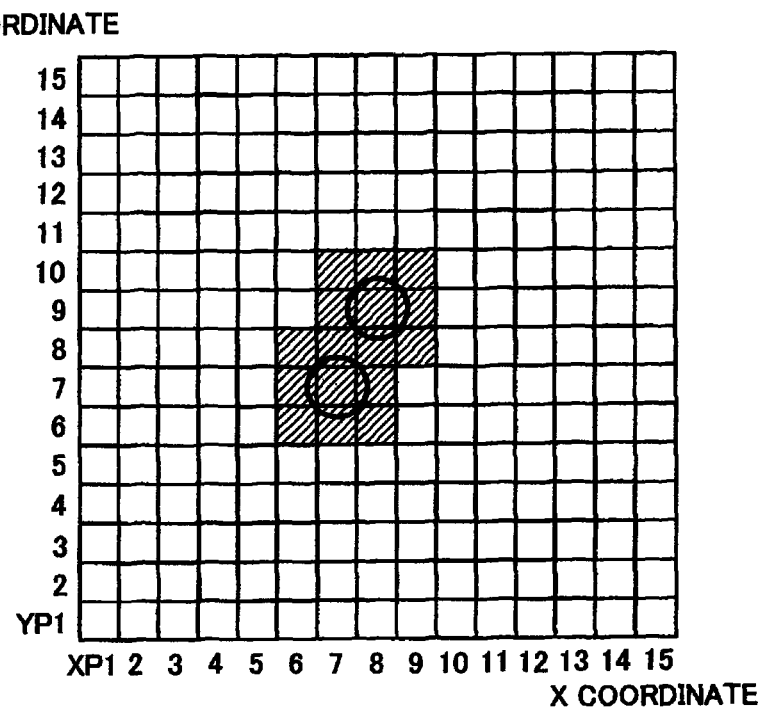
FIGS. 10A and 10B Explanatory diagrams each illustrating the processing contents of Example 1.
Figure 10B:
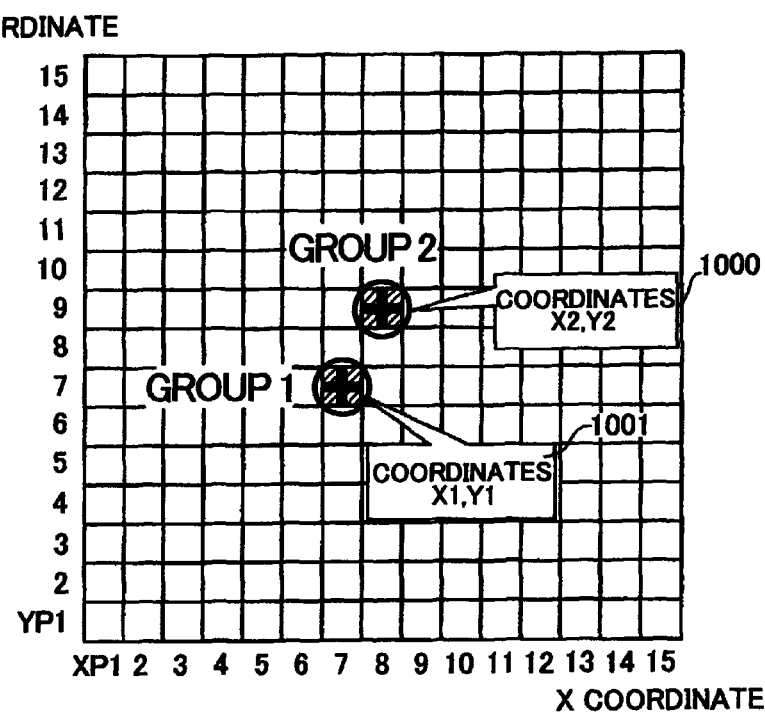

By applying the above-mentioned peak analysis processing, a two-dimensional signal distribution having adjacent input points as illustrated in FIG. 10A is converted into a signal distribution having two separate regions as illustrated in FIG. 10B. Accordingly, two sets of coordinates 1000 and 1001 corresponding to the input points can be calculated.

Hereinabove, the peak analysis processing according to Example 1 has been described in detail. In general, the peak analysis processing only needs to include processing of analyzing structure of a spatial distribution of signal intensity obtained through detection, determining a condition (corresponding to the "threshold" in the above-mentioned example) for separating the spatial distribution of signal intensity into a plurality of regions based on the structure of the spatial distribution of signal intensity, and then processing detection signals in the two-dimensional distribution based on the condition (corresponding to the "threshold processing" in the above-mentioned example).

Example 2

Example 2 of the present invention is described with reference to FIGS. 11 to 14.

Figure 11:
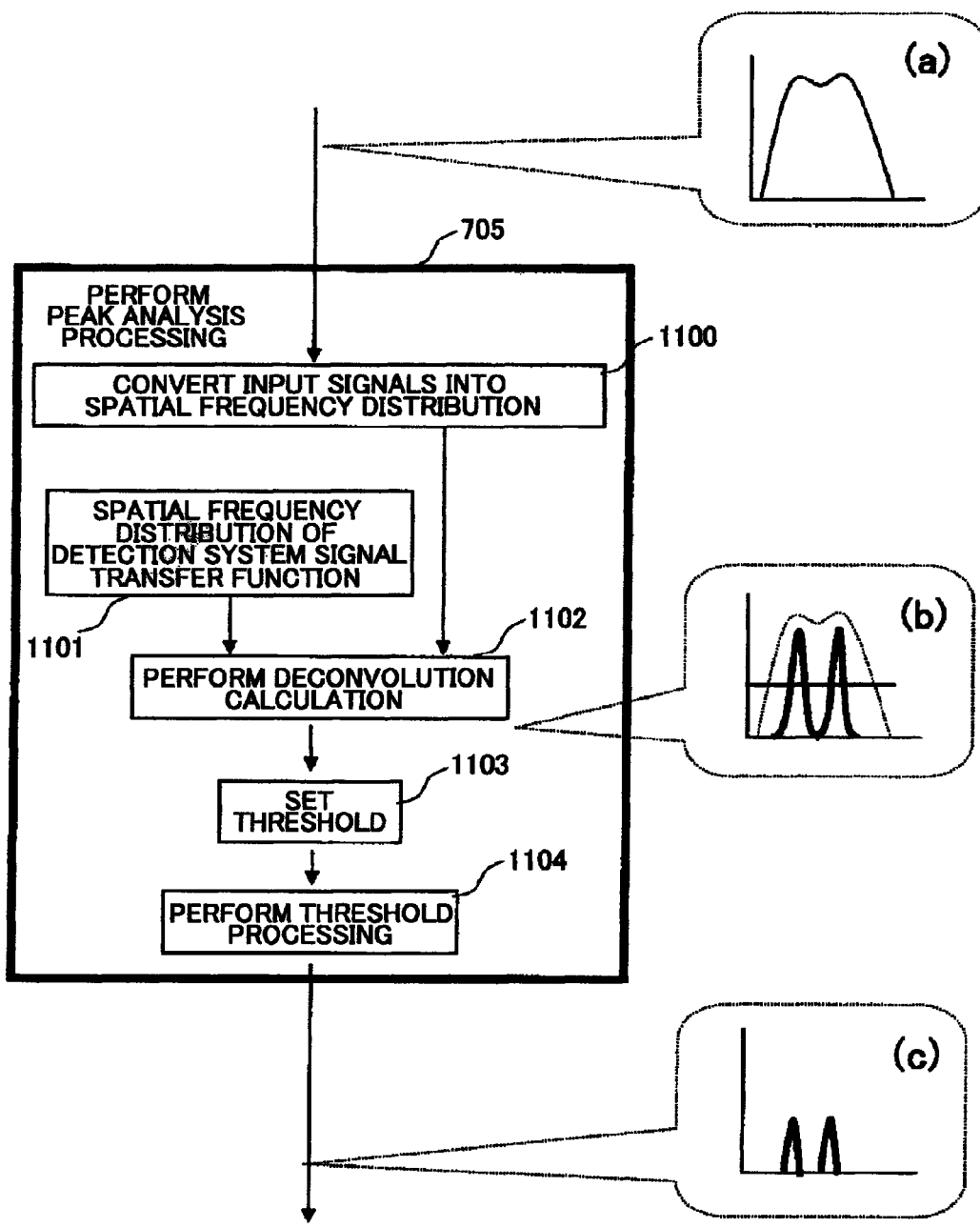
FIG. 11 An explanatory diagram illustrating details of Example 2.

FIG. 11 is an explanatory diagram illustrating details of processing procedures of the peak analysis processing 705. In this example, the peak analysis processing 705 includes processing 1100 of converting input signals into a spatial frequency distribution, deconvolution calculation 1102 using a spatial frequency distribution 1101 of a detection signal system signal transfer function and a processing result of the processing 1100 of converting input signals into a spatial frequency distribution, threshold setting 1103 of setting a threshold based on a result of the calculation, and threshold processing 1104 of processing original data based on the set threshold.

Waveforms illustrated in Part (a), Part (b), and Part (c) of FIG. 11 indicate changes of distribution data (images of the one-dimensional distribution employed for simplicity of the description) at the respective processing stages. At the stage of input to the peak analysis processing 705, the distribution data indicates a slight separation as illustrated in Part (a). After the above-mentioned processings are performed in the peak analysis processing 705, by the time of the stage of the threshold setting 1103, as in the waveform illustrated in Part (b), there is obtained such a distribution that a device-specific signal spread component is removed from the input distribution. A threshold is set for the waveform illustrated in Part (b) (1103). Then, the distribution illustrated in Part (b) is processed again based on the threshold in the threshold processing 1104, to thereby obtain the distribution waveform illustrated in Part (c).

Figure 12A:
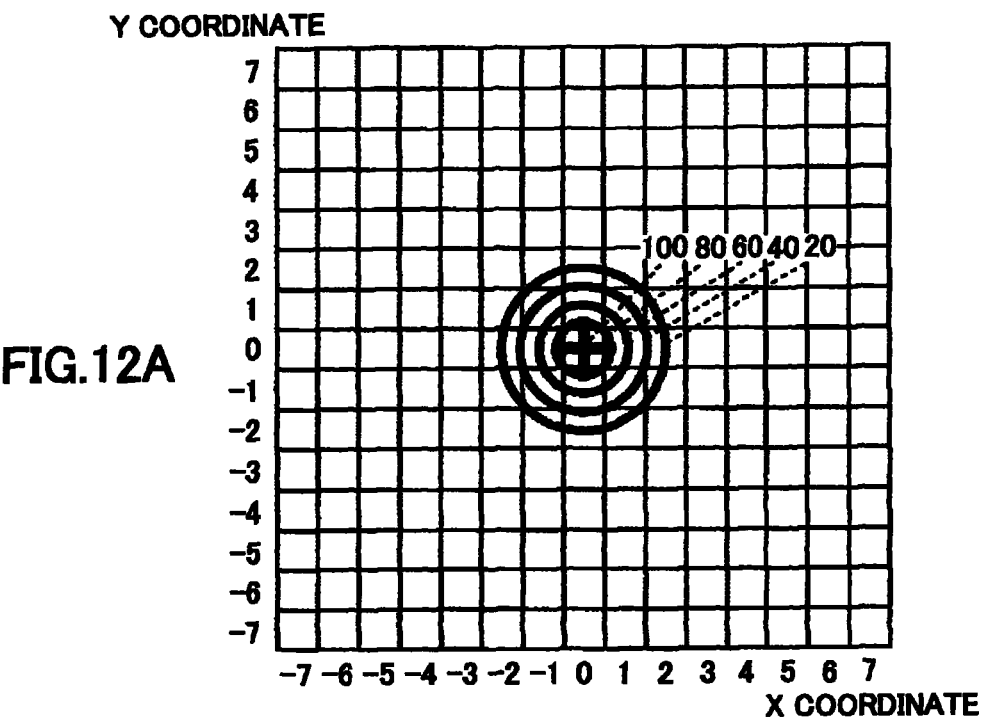
FIGS. 12A and 12B Explanatory diagrams each illustrating a transfer function of a signal detection system.
Figure 12B:
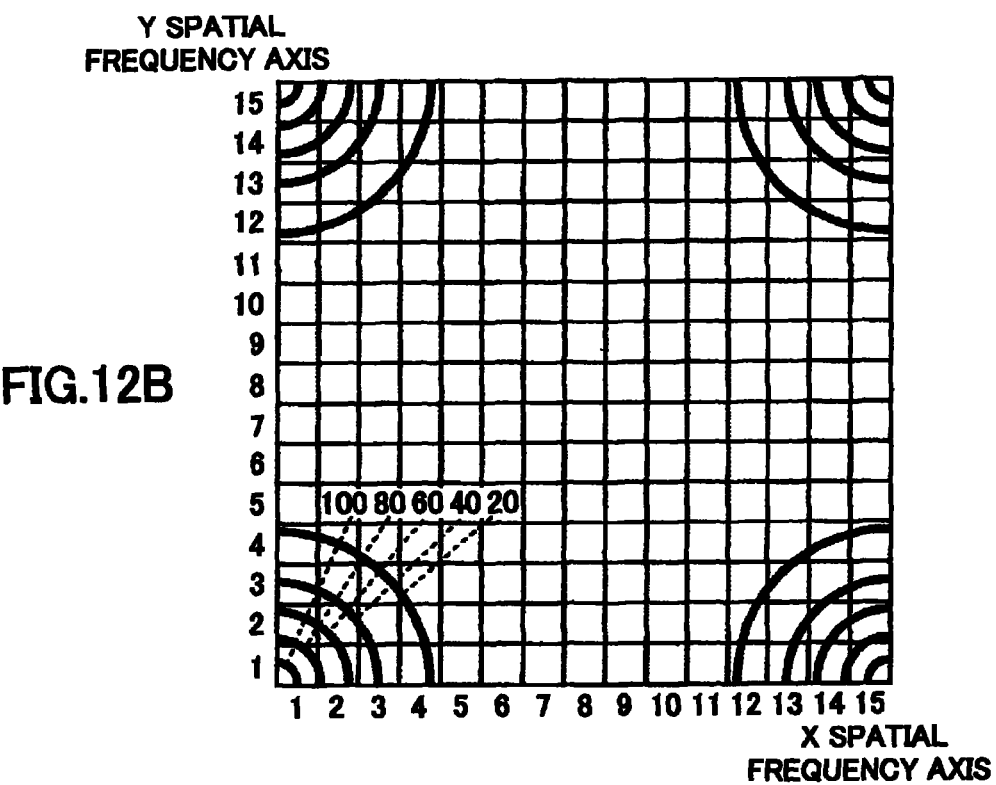

FIGS. 12A and 12B are explanatory diagrams each illustrating the above-mentioned spatial frequency distribution 1101 of the detection signal system signal transfer function. FIG. 12A illustrates a spatial distribution of signals at a time of input to a single point of the multi-touch sensor. It should be noted that spatial coordinate axes are drawn so that the input point (represented by a cross) corresponds to an origin of the coordinate axes. Accordingly, at the time of input to the multi-touch sensor, detection signals form a concentric distribution with its peak set at the input point. When intensity at the input point is assumed as 100, for example, the distribution has its signal intensity decreasing as the distance from the input point becomes larger. FIG. 12B illustrates a result of converting the spatial distribution of signal intensity into a spatial frequency distribution. The abscissa and ordinate both represent relative values of the spatial frequency. The curves of FIG. 12B each represent intensity of the spatial frequency in the form of a contour line. For example, in the vicinity of the point 1 of the abscissa and the point 1 of the ordinate of the spatial frequency, the distribution has intensity of the spatial frequency of 100, and the intensity decreases gradually therefrom.

As the above-mentioned spatial frequency distribution 1101 of the detection signal system signal transfer function illustrated in FIG. 11, the distribution measured in advance, which is illustrated in FIG. 12B, is stored.

The spatial frequency distribution of the detection signal system signal transfer function may be obtained by basically preparing a single point, for example, a central signal of the detection region.

Further, in consideration of a characteristic variation within the detection region, such a method may be employed that spatial frequency distributions of the detection signal system signal transfer function are prepared for a plurality of different points within the detection region, and any one thereof is used as appropriate depending on the position of the input point.

Figure 13A:
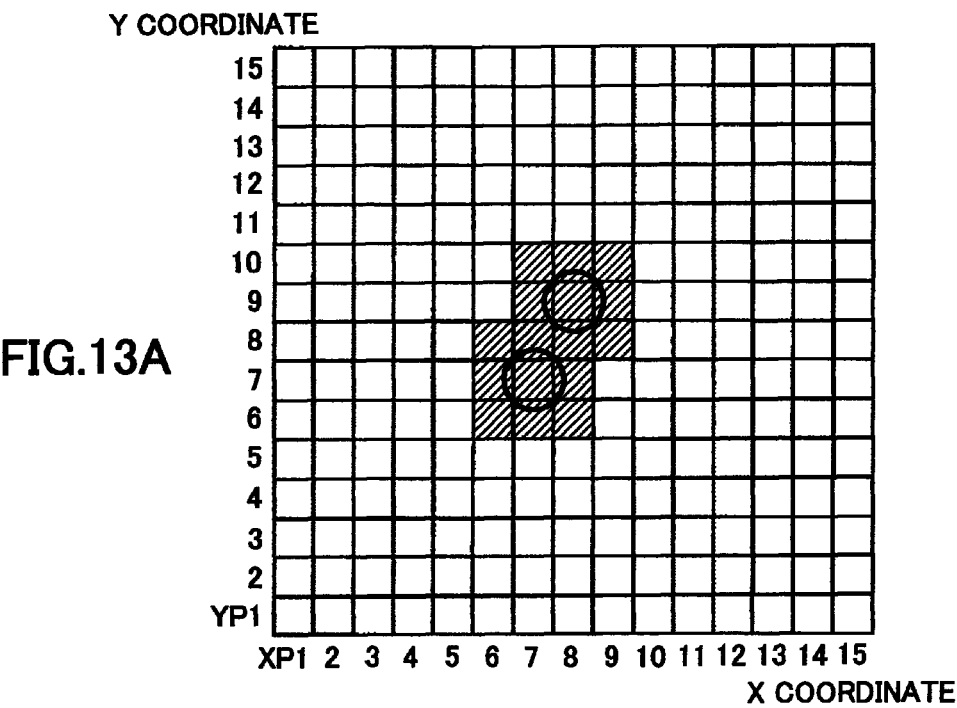
FIGS. 13A and 13B Explanatory diagrams respectively illustrating detection signals and a result of conversion thereof into a spatial frequency.
Figure 13B:
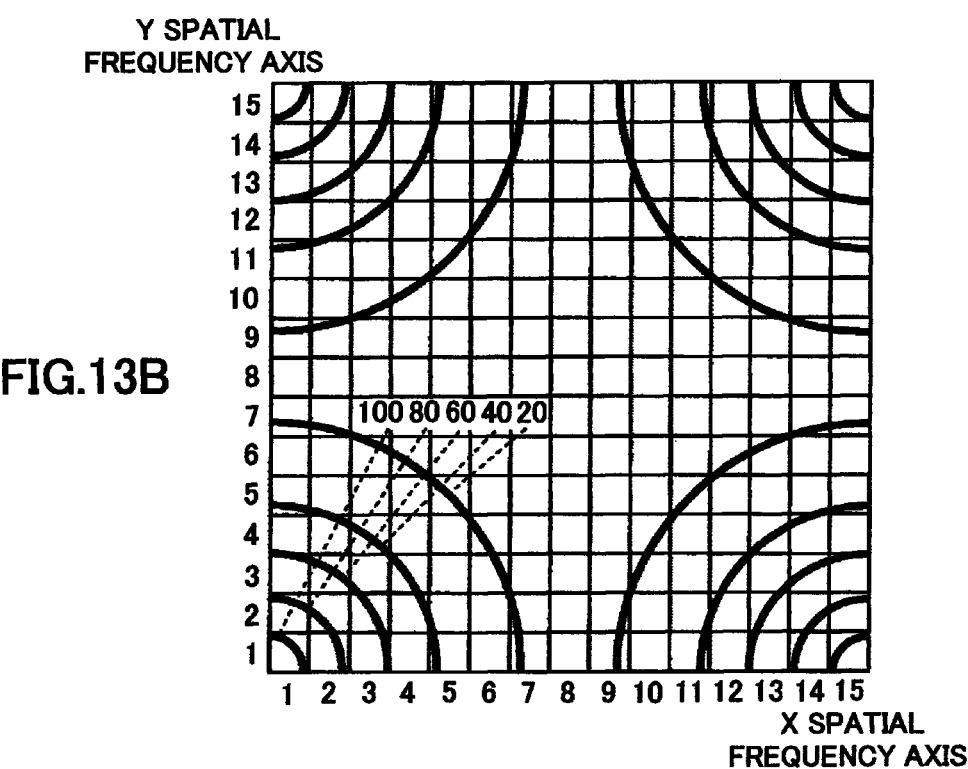
Figure 14A:
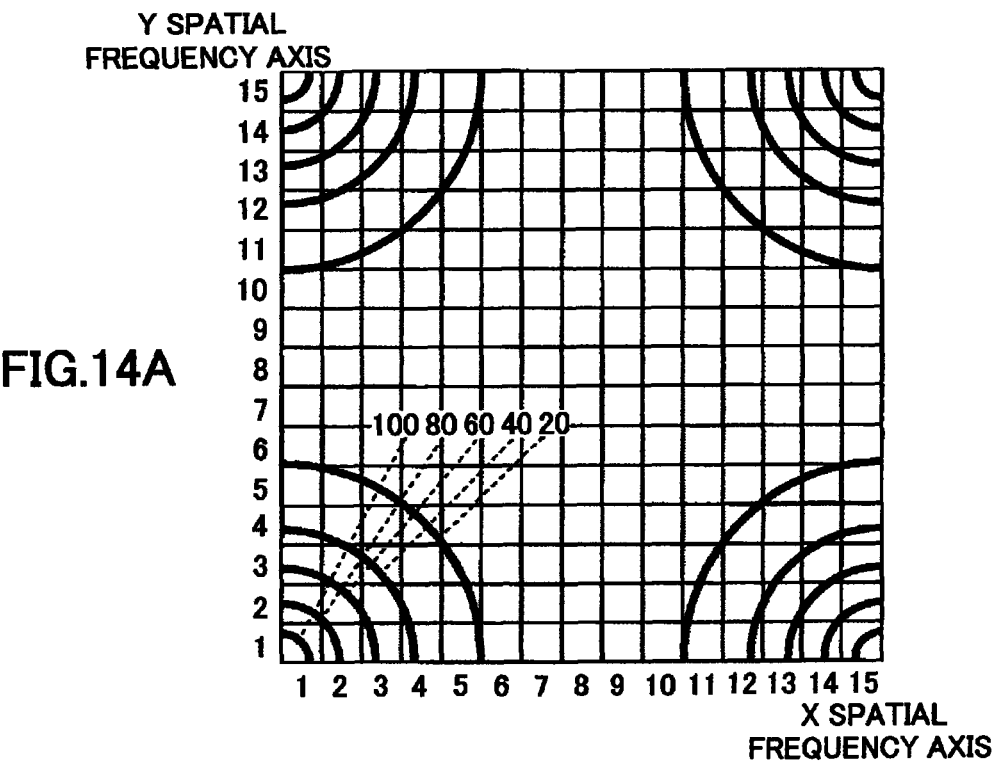
FIGS. 14A and 14B Explanatory diagrams each illustrating a processing result obtained in Example 2.
Figure 14B:
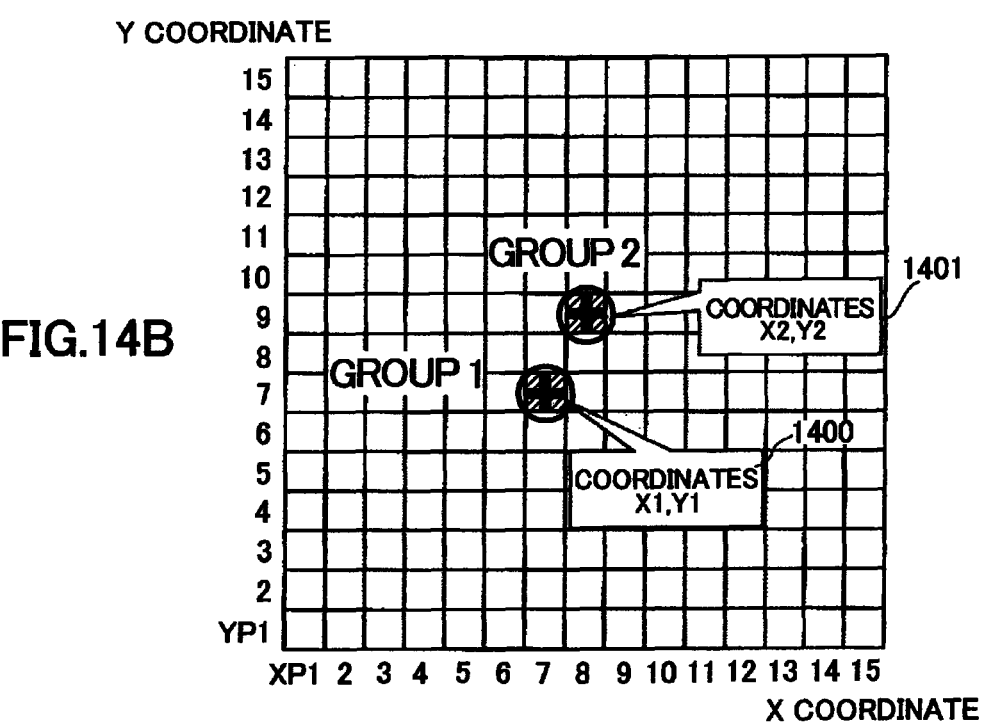

FIGS. 13A and 13B each illustrate a signal intensity distribution at a time of input to two adjacent points of the multi-touch sensor. Circles of FIG. 13A represent input points, and detection signals regarding the input are subjected to threshold processing. The regions remaining thereafter are represented by hatched squares. In this example, in the processing 1100 of converting input signals into a spatial frequency distribution, which is illustrated in FIG. 11, the result of the threshold processing is processed. FIG. 13B illustrates a result thereof. The abscissa and ordinate of FIG. 133 both represent relative values of the spatial frequency. The curves of FIG. 13B each represent intensity of the spatial frequency in the form of a contour line. For example, in the vicinity of the point 1 of the abscissa and the point 1 of the ordinate of the spatial frequency, the distribution has intensity of the spatial frequency of 100, and the intensity decreases gradually therefrom. The distribution varies depending on the input state of the above-mentioned multi-touch sensor, and contains the components illustrated in FIG. 12B. Hence, by removing the components illustrated in FIG. 12B from the distribution illustrated in FIG. 13B, there is obtained such a distribution that the input state of the multi-touch sensor is strongly reflected. Therefore, in this example, the deconvolution calculation 1102 is performed using both the distribution illustrated in FIG. 13B and the distribution illustrated in FIG. 12B. As a result, a distribution of FIG. 14A is obtained. The result is converted into a spatial distribution of signal intensity, to thereby obtain such a spatial distribution of signal intensity as illustrated in FIG. 14B that an influence from the detection signal system signal transfer function is reduced and the input state of the multi-touch sensor is strongly reflected. The result is subjected to the threshold setting 1103 and the threshold processing 1104, to thereby obtain sets of coordinates 1400 and 1401 corresponding to the two input points.

Hereinabove, the peak analysis processing according to Example 2 has been described in detail. In general, the peak analysis processing only needs to include determining a condition (corresponding to the "threshold" in the above-mentioned example) for separating the spatial distribution of signal intensity into a plurality of regions by using the input/output transfer characteristic regarding the signal detection system (corresponding to the "spatial frequency distribution of the detection system signal transfer function" in the above-mentioned example).

As described above, according to the embodiment of the present invention, it is possible to attain the multi-touch sensor capable of highly accurate coordinate calculation irrespective of a distance between input points even for multi-point input using input means having a small contact area, such as a stylus pen. Needless to say, the multi-touch sensor capable of highly accurate coordinate calculation irrespective of a distance between input points can be attained even for multipoint input using a plurality of fingers and for multipoint input using one or a plurality of stylus pens or the like and one or a plurality of fingers. Highly accurate multipoint input can be performed even in, for example, a case where a full keyboard is displayed on a display device of a small-size, portable electronic device, and a Shift key, a Ctrl key, or an Alt key of the full keyboard is held with a finger of the left hand while a character key, a symbol key, a number key, or a Delete key is pressed with a stylus pen held in the right hand.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A sensor apparatus for detecting contact or proximity of an object, comprising:
 a calculation section for separating a plurality of points of the contact or the proximity that are generated simultaneously, and calculating individual sets of positional coordinates,
 wherein the calculation section comprises an analysis section for determining, based on a first signal intensity distribution on a flat touch sensor detected by a signal from the flat touch sensor, a first threshold for removing noise contents and offset contents from the first signal intensity distribution, and
 wherein, after removing the noise contents and the offset contents from the first signal intensity distribution by using the first threshold so as to generate a second signal intensity distribution on the flat touch sensor, the analysis section is configured to determine a second threshold for separating the second signal intensity distribution into a plurality of regions, each of which regions has a peak in accordance with the second signal intensity distribution.

2. The sensor apparatus according to claim 1, wherein the analysis section is configured to analyze structure of the signal intensity distribution obtained through the detection, to thereby determine the threshold for separating the signal intensity distribution into the plurality of regions based on the structure of the signal intensity distribution.

3. The sensor apparatus according to claim 2, wherein the analysis section is configured to convert a two-dimensional distribution of the signal intensity into a plurality of one-dimensional distributions, and to analyze a result of the conversion, to thereby determine the threshold for separating the signal intensity distribution into the plurality of regions.

4. The sensor apparatus according to claim 3, wherein the plurality of one-dimensional distributions comprise two one-dimensional distributions corresponding to axes of the two-dimensional distribution, respectively.

5. The sensor apparatus according to claim 3, wherein the analysis section is configured to perform the conversion into the plurality of one-dimensional distributions by performing orthogonal projection of the original two-dimensional distribution with respect to one-dimensional axes for the conversion.

6. The sensor apparatus according to claim 3, wherein the analysis section is configured to determine a threshold for obtaining a maximum number of intervals each of which includes peak existing in each of the plurality of one-dimensional distributions obtained through the conversion of the two-dimensional distribution, to thereby determine the threshold for separating the signal intensity distribution into the plurality of regions.

7. The sensor apparatus according to claim 2, wherein the analysis section is configured to perform a process, after the threshold for separating the signal intensity distribution into the plurality of regions is obtained, to leave data greater than the threshold among a two-dimensional distribution of the signal intensity.

8. The sensor apparatus according to claim 1, wherein the analysis section is configured to use a spatial frequency distribution of a detection signal system signal transfer function, to thereby determine the threshold for separating the signal intensity distribution into the plurality of regions.

9. The sensor apparatus according to claim 8, wherein the analysis section is configured to obtain the spatial frequency distribution of the detection signal system signal transfer function based on a two-dimensional signal intensity distribution obtained by a capacitance detection section with respect to a reference input to the touch sensor.

10. The sensor apparatus according to claim 9, wherein the analysis section is configured to convert the two-dimensional signal intensity distribution obtained by the capacitance detection section with respect to the reference input to the touch sensor into a spatial frequency distribution, to thereby obtain the spatial frequency distribution of the detection signal system signal transfer function.

11. The sensor apparatus according to claim 10, wherein the analysis section is configured to convert a two-dimensional signal intensity distribution to be measured by the capacitance detection section into a spatial frequency distribution, and to perform deconvolution calculation using the spatial frequency distribution and the prestored spatial frequency distribution with respect to the reference input.

* * * * *